July 27, 1926.

J. G. SWAIN 1,593,886

WHEEL AND DEMOUNTABLE RIM

Filed August 10, 1920       2 Sheets-Sheet 1

Inventor
Joseph G Swain

July 27, 1926.

J. G. SWAIN 1,593,886

WHEEL AND DEMOUNTABLE RIM

Filed August 10, 1920      2 Sheets-Sheet 2

Inventor
Joseph G. Swain

By G. L. Ely
Attorney

Patented July 27, 1926.

1,593,886

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL AND DEMOUNTABLE RIM.

Application filed August 10, 1920. Serial No. 402,656.

This invention relates to improvements in vehicle wheels and has particular reference to improvements in wheels of the demountable rim type.

The object of my invention is to provide a wheel of the above mentioned type that is capable of carrying rims of different widths. In the service of the automobile wheel, it is often desired to use an oversized tire and rim, which necessitates the substitution of a second wheel of the correct size, the felloe band on ordinary wheels being made to fit correctly only one size of rim. My invention furnishes a construction by means of which such substitution may be accomplished without altering the wheel structure.

The above and other objects will more fully appear from the following description and will be especially pointed out in the claims.

Figure 1:
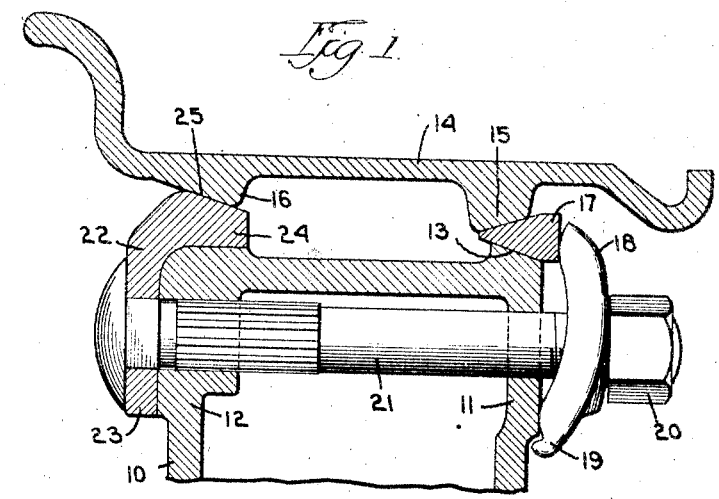
Fig. 1 is a transverse section through the felloe portion of a wheel, showing a rim of normal size affixed.

In the drawings 10 represents the fixed rim or felloe of the wheel which may be formed in any preferred manner. The felloe is made with two parallel flanges, the outer one of which is designated by the numeral 11 and the inner one by the numeral 12. The outer edge of the flange 11 is formed with a beveled bearing surface or seat 13 for one side of the demountable rim 14.

The rim shown in this form of the invention illustrated in Fig. 1 and designated 14 is of the straight side type, being formed with two oppositely turned beveled ribs, the outer one being numbered 15, and the inner one 16. Between the beveled surface of the rib 15 and the seat 13 is interposed a wedge ring 17 which is forced into place by a number of clamping devices one of which is shown as a clamp plate 18 fulcruming at 19 on the side of the wheel, being held into place by a nut 20 threaded on the end of a bolt 21 which passes through the parallel flanges of the felloe. A sufficient number of bolts and clamps are located about the wheel to securely hold the rim.

Carried on the flange 12 is a supplemental bearing surface such as an annular ring 22, said ring being angular in form, the body portion 23 fitting to the side of the felloe, it being firmly held in place by the bolts 21, the angular flange 24 conforming to the configuration of the outer circumferential edge of the flange 12. The portion 24 of the ring 22 is formed with an inclined beveled surface 25 adapted to seat the rib 16 of the demountable rim.

Figure 2:
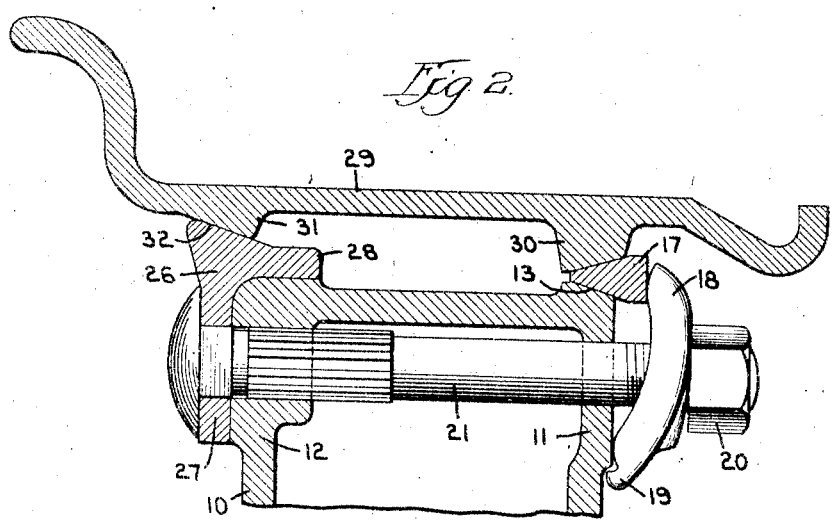
Fig. 2 is a similar view, but showing a larger or over-size rim in place.

Referring to Fig. 2, it is seen that in order to accommodate a rim of greater width, it is necessary only to replace the ring 22 adapted to support the smaller size rim with a second ring 26. Like the ring 22, the ring 26 is angular in cross section, having a vertical portion 27 and an inwardly extending flange 28, both of said flanges being adapted to fit closely on the flange 12. 29 designates the larger size rim, which is provided with ribs 30 and 31, similar to ribs 15 and 16. The rib 30 is positioned by the wedge ring 17, the other rib 31 being seated on an inclined projection 32 formed outwardly on the ring 26.

Figure 3:
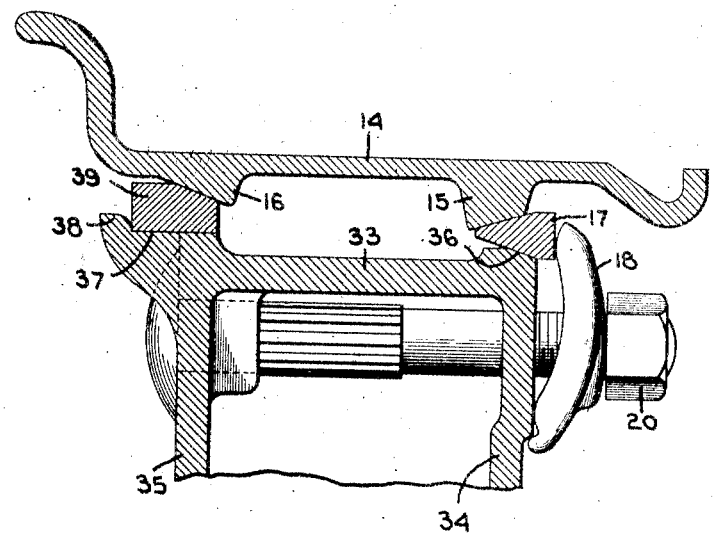
Fig. 3 is a sectional view of another form of the invention showing an ordinary size rim in place.
Figure 4:
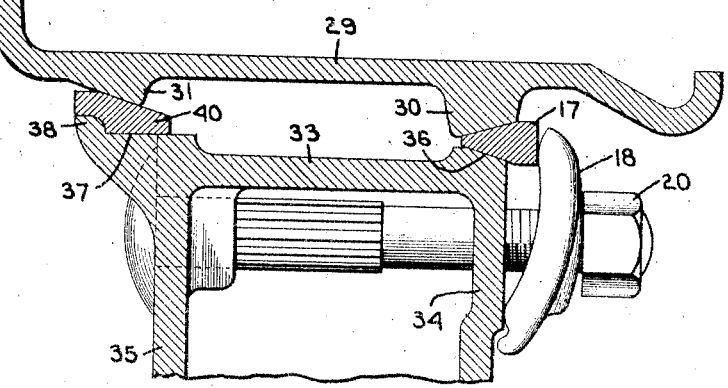
Fig. 4 is a similar view to Fig. 3, but showing a larger or over-size rim.

In Figs. 3 and 4 I have illustrated another form of my invention. The wheel or fixed rim 33 is provided with the usual parallel flanges, the inner one being numbered 35 and the outer one 34, upon which is formed a beveled bearing seat 36 for one side of the demountable rim 14, the wedge ring 17 being interposed between the surface 36 and the inclined face of the rib 15 formed on the rim 14. The circumference of the annular flange 35 is made with a flat widened surface 37, and a beaded portion 38 at its edge. A ring 39 is adapted to be received on the surface 37, the bead 38 limiting its lateral movement, said ring being constructed with a beveled seat upon which is seated the rib 16 of one side of the rim 14.

To accommodate the larger size rim 29, a second ring 40 is substituted for the ring 39, which ring 40 is received on the seat 37 and protrudes outwardly further than the ring 39. It can easily be seen from an inspection of Figs. 3 and 4 that I may adapt the wheel 33 to an ordinary or to an over-size rim without even removing the wheel from its place on an automobile.

It is obvious that the construction shown is simple, inexpensive, and very easily changed, it being required to replace the removable side ring only when changing from one size to another. It does away with the necessity of providing wheels of different sizes to conform with the use of regular or over-size tires.

It also can be seen that the rings 22 and 26 or the rings 39 and 40 may be made of greater or less widths and the size of the rims used may be greatly varied.

Having disclosed specific forms of the invention, it is not confined to such forms only, but may be altered or modified as may seem desirable to one of mechanical skill and still fall within the scope of the invention.

I claim:—

1. In a wheel construction, a fixed rim having bearing surfaces upon the peripheral edges thereof, one of which is outwardly inclined, a demountable rim formed on its under sides with oppositely inclined marginal bearing surfaces, a removable wedge-shaped ring for engaging the inclined bearing surfaces of the rims, said ring being transversely adjustable, a removable annular ring having an inclined surface to engage the other bearing surface of the demountable rim, and means extending through the annular ring and the fixed rim to secure the rings in position, said means including a clamping plate fulcrumed on one side of the fixed rim and adapted to engage the wedge-shaped ring.

2. In a wheel construction, a fixed rim having peripheral flanges thereon, one of said flanges being inclined outwardly, a removable wedge-shaped ring to engage the inclined flange of said rim, said ring being transversely adjustable, an annular ring surrounding the other flange, said annular ring having an inwardly inclined upper bearing surface, a demountable rim formed on its under sides with oppositely inclined marginal surfaces adapted to rest on the bearing surfaces of said rings, bolts extending through the annular ring and the fixed rim, nuts threaded upon the bolts, and means upon the threaded ends of the bolts for retaining the wedge-shaped ring in adjusted position.

JOSEPH G. SWAIN.